United States Patent
Chen et al.

(10) Patent No.: US 8,483,056 B2
(45) Date of Patent: Jul. 9, 2013

(54) ANALYSIS APPARATUS AND METHOD FOR ABNORMAL NETWORK TRAFFIC

(75) Inventors: Jingmei Chen, Beijing (CN); Sijie Ding, Toronto (CA)

(73) Assignee: NSFOCUS Information Technology Co., Ltd., Beijing (CN)

( * ) Notice: Subject to any disclaimer, the term of this patent is extended or adjusted under 35 U.S.C. 154(b) by 155 days.

(21) Appl. No.: 13/120,989

(22) PCT Filed: Sep. 24, 2009

(86) PCT No.: PCT/CN2009/001074
§ 371 (c)(1),
(2), (4) Date: Jun. 14, 2011

(87) PCT Pub. No.: WO2010/037261
PCT Pub. Date: Apr. 8, 2010

(65) Prior Publication Data
US 2011/0261710 A1    Oct. 27, 2011

(30) Foreign Application Priority Data
Sep. 26, 2008    (CN) .......................... 2008 1 0223052

(51) Int. Cl.
*G01R 31/08*    (2006.01)
*G06F 11/00*    (2006.01)
*G06F 12/14*    (2006.01)
*G06F 12/16*    (2006.01)
*G08C 15/00*    (2006.01)
*H04J 1/16*    (2006.01)
*H04J 3/14*    (2006.01)
*H04L 1/00*    (2006.01)
*H04L 12/26*    (2006.01)
*G08B 23/00*    (2006.01)

(52) U.S. Cl.
USPC ........... 370/230; 370/233; 370/234; 370/235; 370/236; 370/252; 370/253; 709/219; 709/236; 726/22; 726/23; 726/24; 726/25

(58) Field of Classification Search
USPC ................. 370/230, 233, 234, 235, 236, 252, 370/253; 709/231, 219, 226; 726/3, 4, 12, 726/13, 17, 22–25, 27, 30
See application file for complete search history.

(56) References Cited

U.S. PATENT DOCUMENTS

| | | | |
|---|---|---|---|
| 8,020,205 B2 * | 9/2011 | Keeni | 726/22 |
| 2003/0014377 A1 * | 1/2003 | Barson et al. | 706/20 |
| 2004/0025044 A1 * | 2/2004 | Day | 713/200 |

(Continued)

FOREIGN PATENT DOCUMENTS

| | | |
|---|---|---|
| CN | 101026510 A | 8/2007 |
| CN | 101060444 A | 10/2007 |

OTHER PUBLICATIONS

International Search Report for PCT/CN2009/001074, mailed Dec. 31, 2009.

*Primary Examiner* — Benjamin H Elliott, IV
(74) *Attorney, Agent, or Firm* — Withrow & Terranova, P.L.L.C.

(57) ABSTRACT

The present invention discloses a network abnormal traffic analysis method, which calculates a set of index values of a monitored server based on the acquired IP network data, performs a primary detection on the calculated set of index values to generate vector corresponding to the set of index values, and performs a secondary detection on the vector to determine whether abnormal traffic and abnormal types related to the monitored server exist. The present invention also relates to a network abnormal traffic analysis apparatus related therewith and a network traffic monitoring system and method adopting these network abnormal traffic analysis method and apparatus.

22 Claims, 7 Drawing Sheets

U.S. PATENT DOCUMENTS

| | | | |
|---|---|---|---|
| 2004/0250124 A1* | 12/2004 | Chesla et al. | 713/201 |
| 2005/0125195 A1* | 6/2005 | Brendel | 702/182 |
| 2005/0210533 A1* | 9/2005 | Copeland et al. | 726/23 |
| 2006/0074834 A1 | 4/2006 | Dong et al. | |
| 2007/0019548 A1* | 1/2007 | Krishnamurthy | 370/232 |
| 2011/0261710 A1* | 10/2011 | Chen et al. | 370/252 |

* cited by examiner

ANALYSIS APPARATUS AND METHOD FOR ABNORMAL NETWORK TRAFFIC

This application is a 35 USC 371 National Stage filing based on PCT/CN2009/001074, filed Sep. 24, 2009, which claims priority to Chinese Patent Application No. 200810223052.X filed Sep. 26, 2008, the disclosures of which are incorporated herein by reference in their entireties.

TECHNICAL FIELD

The present invention relates to the field of network security, in particular to an apparatus and method for analyzing abnormal traffic in a network.

BACKGROUND

With the prevalence of network, incidents of network intrusions and hacker attacks are also increasing. In this case, Intrusion Detection System (IDS) and Intrusion Protection System (IPS) emerge as the times require. The major principle for the operation of these systems is to render data streams in the network from received data packets, and then generally to check whether features of an attack exist in the rendered data streams in light of a feature matching approach. At the same time, some statistic approaches may also adopted for detecting attacks such as port scanning.

As IDS/IPS analyzes the rendered data streams according to predetermined rules and detection modes, IDS/IPS has the advantage of being accurate with the detection results. However, traditional IDS/IPS has some inherent shortcomings. Firstly, since IDS/IPS needs to render data streams from the received data packets (i.e., the so-called packet inside detection), the performance of these systems is often limited by the packet inside detect process. When IDS/IPS is operated in an environment of large network traffic, the limitation to the performance becomes more obvious. Secondly, given the fact that the predetermined rules and detection modes in IDS/IPS need to be updated for detecting all kinds of intrusion modes and measure that newly appear in the current network, and new intrusion modes and measures emerge increasingly rapidly with the increasing prevalence of various kinds of new networks, such as Social Network Site (SNS) and P2P network, traditional IDS/IPS has the disadvantage of relatively slow update. A further inherent disadvantage of traditional IDS/IPS lies in that due to the packet inside detection of the data packets, traditional IDS/IPS cannot detect data packets with encrypted content, and thereby cannot analyze data streams comprising encrypted content. Since the new generation of IP transmission protocol IPV6 generally encrypts the data, it is difficult for the current IDS/IPS to be applied to networks based on IPV6.

Therefore, what is desired is an abnormal traffic analysis apparatus and method which can be used in IDS/IPS and which can overcome the above disadvantages of traditional IDS/IPS. Besides, the abnormal traffic analysis apparatus and method can be well applied to networks based on IPV6.

SUMMARY

Accordingly, the object of the present invention is to provide an abnormal traffic analysis apparatus and method for overcoming the above defects.

According to one aspect of the present invention, there is provided an abnormal traffic analysis method, comprising the following steps: acquiring IP network data; calculating a set of index values of a monitored server based on the acquired IP network data, wherein each index value of the set of index values reflects data streams related to the monitored server and said each index value can be calculated from header the IP data packet; performing a primary detection on the calculated set of index values to generate a vector, said vector corresponding to the set of index values, wherein each element of the vector element indicates the degree of abnormality of a corresponding index value; and performing a secondary detection on the vectors to determine whether abnormal traffic and abnormal types related to the monitored server exist.

According to a further aspect of the present invention, there is provided an abnormal flowtraffic analysis apparatus, comprising a data acquisition module, for acquiring IP network data; an index calculation module, for calculating a set of index values of a monitored server based on the acquired IP network data, wherein each index value of the set of index values reflects data streams related to the monitored server and said each index value can be calculated from header of the IP data packet; a primary detection module, for performing a primary detection on the calculated set of index values to generate a vector, said vector corresponding to the set of index values, wherein each element of the vector indicates the degree of abnormality of a corresponding index value; and a secondary detection module, for performing a secondary detection on the vector to determine whether abnormal traffic and abnormal types related to the monitored server exist.

The present invention further provides network traffic monitoring method and system that respectively employ the above abnormal traffic analysis method and apparatus.

The network abnormal traffic analysis apparatus and method according to the present invention can determine the computer being attacked in a given scope of computers, the accurate attack type and the accurate attack source through simple analysis and detection of header of each data packet in the network at the transmission layer, without carrying out a packet inside detection. Thereby, the network abnormal traffic analysis apparatus and method according to the present invention have the advantage of high detection efficiency. A network abnormal traffic analysis apparatus having a dual core processor with a frequency of 2 GHZ can usually analyze and detect at the same time 100 thousand to 1 million computers. Therefore, the network abnormal traffic analysis apparatus according to the present invention can be widely used by being deployed in places with large network traffic, such as backbone network, IDC, enterprise entrance and so on.

In addition, as the network abnormal traffic analysis apparatus and method according to the present invention can perform abnormality detection without a packet inside detection, the apparatus and method are also effective for encrypted data packets. Thus, the apparatus and method are also adapted for abnormal traffic detection of encrypted data transmission usually adopted by national security departments and the army. Moreover, the apparatus and method can be widely used in networks based on IPV6.

BRIEF DESCRIPTION OF THE DRAWINGS

By reading the detailed description of the embodiments in the following, one skilled in the art can be clearer about other advantages and benefits. The drawings are only used for showing the embodiments and should not be construed as limiting the invention. The same reference signs represent the same components throughout the drawings, in which.

DETAILED DESCRIPTION

Figure 1:
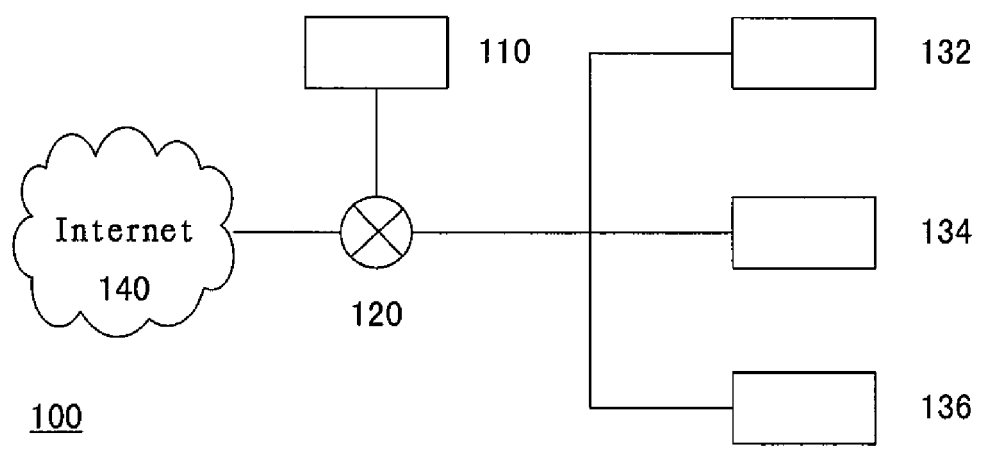
FIG. 1 illustrates a typical application environment for a network abnormal traffic analysis apparatus according to the present invention.

FIG. 1 illustrates a typical application environment 100 for a network abnormal traffic analysis apparatus 110 according to the present invention. As shown in FIG. 1, network servers 132, 134, 136, etc. are connected to Internet 140 via a routing device 120, so data of network servers 132-136 sending to and/or receiving from the outer network all need to pass the routing device 120. The network abnormal traffic analysis apparatus 110 is coupled to the routing device 120, via which it accesses data streams of the network servers 132-136, and hence to analyze the network abnormal traffic related to network servers 132-136.

It is obvious that the network abnormal traffic analysis apparatus 110 can exist not in the form of a single device, but instead, be merged into the routing device 120 as a component of the routing device 120.

Figure 2:
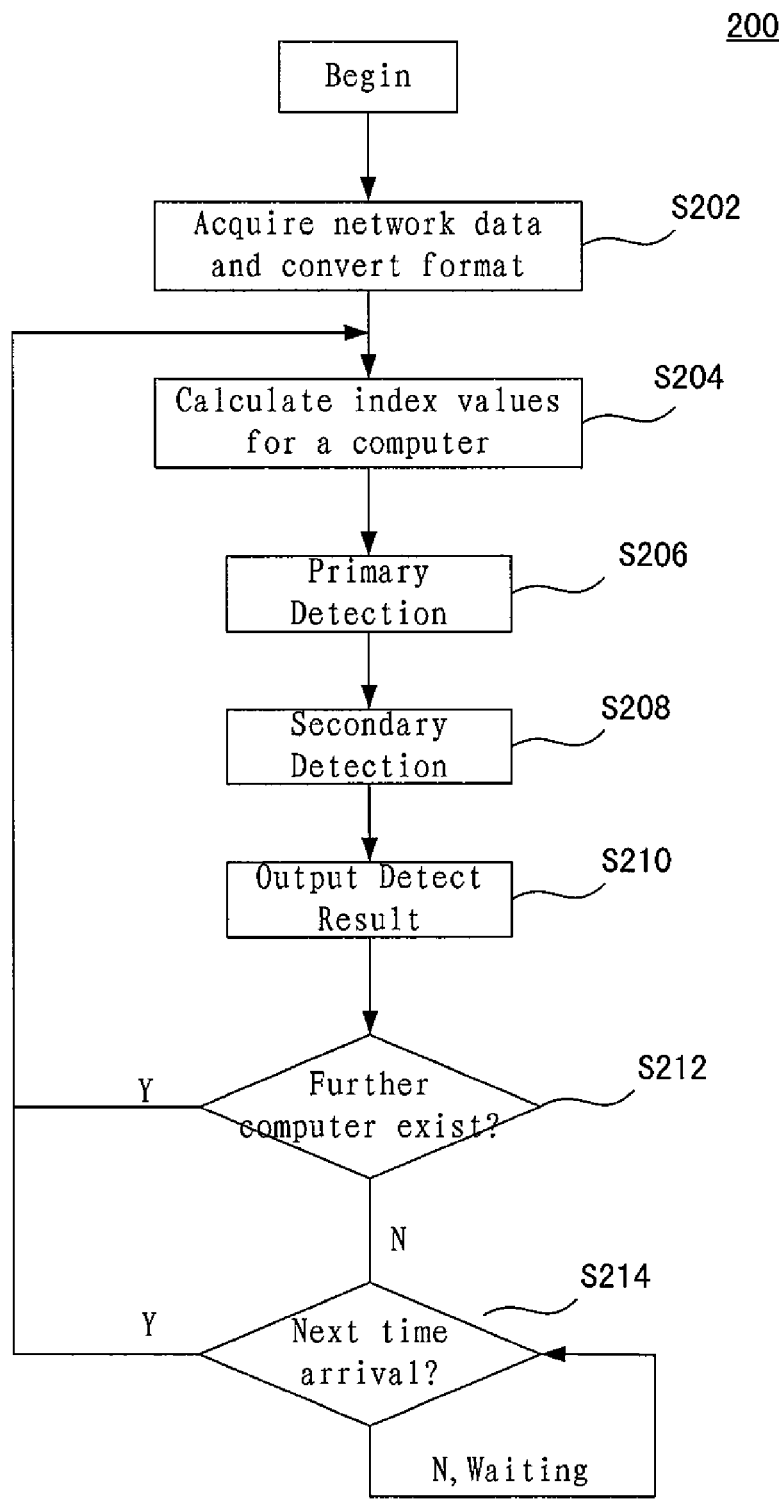
FIG. 2 illustrates a network abnormal traffic analysis and detection method in accordance with an embodiment of the present invention.

FIG. 2 illustrates a network abnormal traffic analysis and detection method 200 for use in the network abnormal traffic analysis apparatus 110 as shown in FIG. 1.

The network abnormal traffic analysis and detection method 200 begins with step S202. In step S202, firstly, network data of various kinds of formats are acquired. As shown in FIG. 1, the network abnormal traffic analysis apparatus 110 depends on the routing device 120 to acquire various kinds of network data, and the routing device 120 may adopt different measures to acquire network data flowing through it, so the acquired data may have various formats. For instance, the acquired data can be in raw data format, netflow data format, sflow data format, etc. In the method, in order to uniformly process the acquired data with different formats, step S202 further comprises the step of converting data in different formats into data in a uniform data format as used in the subsequent steps of the method. According to an embodiment of the present invention, the data format used in the method can be illustrated in table 1 as follows:

TABLE 1

| Field name | Brief description |
| --- | --- |
| flowStartTime | Start time of a data stream |
| sample | Sample rate |
| flowType | Indicating the type of the data stream, such as TCP, UDP or ICMP |
| ipSrc | Source IP address |
| ipDst | Destination IP address |
| portSrc | Source port number |
| portDst | Destination port number |
| packets | Number of packets comprised in the stream |
| octets | Number of bytes comprised in the stream |
| asSrc | The source AS (Autonomous Systems) number |
| asDst | Destination As (Autonomous Systems) number |
| ifInIndex | The identity of device interface used for receiving the stream |
| ifOutIndex | The identity of device interface used for forwarding the stream |

It can be seen from the format shown in table 1, the data required in the present invention can all be acquired based on the fields in the header of IP packet and does not require content of the payload of the IP packets. Therefore, the present invention does not have to carry out a packet inside detection. Besides, if the data per se acquired by the routing device 120 have the format according to table 1, no format conversion is needed in step S202.

In step S204, index values for each monitored server are calculated based on the data streams acquired in step S202. Generally speaking, the established index must reflect the situation of the IP data streams related to the server quite correlatively. Usually, the selection of index should firstly satisfy at least two requirements, i.e., the index value being not directly related to the amount of the traffic and to the time scale, such that the established index can be adapted for various kinds of traffic and time scales. Thereby, proportional relations are adopted preferably for the indexes.

According to an embodiment of the present invention, the selected indexes include:

$X_1$. Tcp traffic ratio: (TCP traffic)/(total traffic)

X2. Udp traffic ratio: (UDP traffic)/(total traffic)

$X_3$. Icmp traffic ratio: (ICMP traffic)/(total traffic)

$X_4$. Destination IP ratio: (the number of destination IP)/(total number of stream)

$X_5$. Source IP ratio: (the number of source IP)/(total number of stream)

$X_6$. Destination port ratio: (the number of destination port)/(total number of stream)

$X_7$. Source port ratio: (the number of source port)/(total number of stream)

The calculation of each index value are usually carried out at a certain time interval (controlled by the following step S214), the time interval generally spanning from several seconds to several dozen seconds, which depends on the specific environment where the network abnormal traffic analysis apparatus 110 is deployed. The time interval is usually selected as 20 seconds. So in step S204, the above indexes are calculated every 20 seconds so as to acquire a set of index values $\{x_{1,i}, x_{2,i}, x_{3,i}, \ldots, x_{7,i}\}$. Since the acquisition of data streams is a consecutive process, and values required for the calculation of each index, for instance Tcp traffic, Udp traffic and stream number, need to be acquired by consecutive acquisition and counting, the specific processing of step S204 is as follows: firstly, consecutively computing basic data necessary for computing each index value based on the data streams acquired in step S202, for instance, total traffic, Tcp traffic, Udp traffic, Icmp traffic, number of steam, the number of source IP or port, the number of destination IP or port at a selected time interval. Then, after a predetermined time interval controlled by step S214, each index value is calculated to acquire a set of index values $\{x_{1,i}, x_{2,i}, x_{3,i}, \ldots, x_{4,i}\}$ related to a certain time i.

In step S204, it should be noted that the counting of the number of source or destination IP and ports is an algorithm that consumes memory considerably. For instance, in an IPV4 network, IP addresses are presented in 32 bits and port numbers are presented in 16 bits, so theoretically, there are $2^{32}-1$ IP addresses and $2^{16}-1$ port numbers. When counting the numbers of IP addresses and ports, it is necessary to judge whether the IP addresses and the ports appear repeatedly. As there is huge number of the IP addresses and ports information, this judgment will consume considerable memory, which is unacceptable for a network having large data traffic.

Therefore, the applicant also adopts in step S204 a Bloom filter algorithm which was put forth by Bloom, Burton H. (in article "Space/time trade-offs in hash coding with allowable errors", Communications of the ACM 13(7): 422-426, 1970) for counting the number of source or destination IP and ports in a rapid and memory-saving manner.

Figure 3:
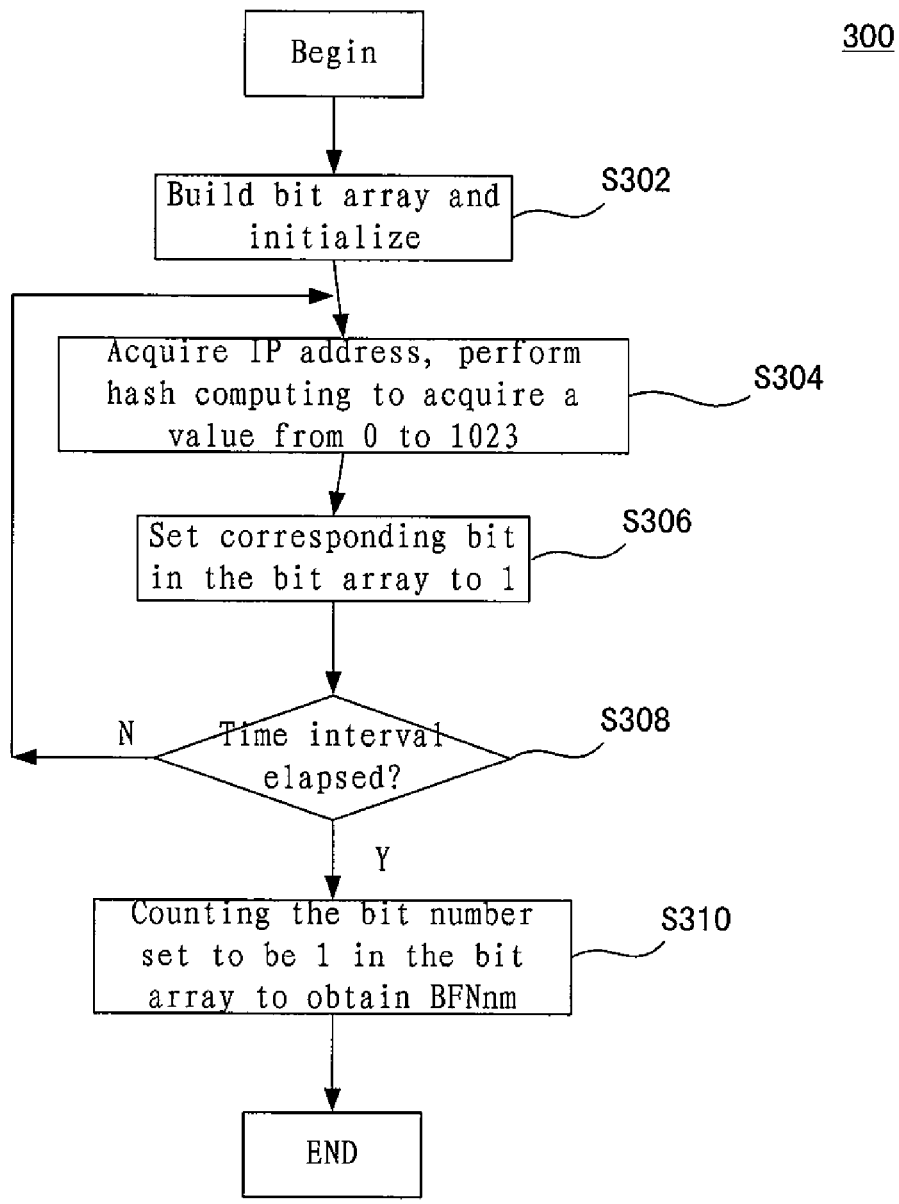
FIG. 3 illustrates the specific flowchart for applying Bloom filter algorithm in the network abnormal traffic analysis and detection method in accordance with an embodiment of the present invention.

FIG. 3 illustrates the specific flowchart 300 of applying Bloom filter algorithm in step S204 of the present invention. Firstly, in step S302, a bit array of 1024 bits is established at the beginning of a new time interval, where all the bits are set to 0. Then, in step S304, an acquired source IP address is hash calculated to acquire a integer between 0 and 1023. In step S306, the bit value whose index equals to the integer calculated in step S304 in the bit array is set to 1. For example, if the hash value calculated in step S304 is 450, the value of the $450^{th}$ bit in the bit array is set to 1. In step S308, it is determined whether the time interval has expired, if not, a new source IP address is acquired in step S310 and processed back to step S304. If it is determined that the time interval has expired in step 308, in step 312, the number of bits which are set to 1 in the bit array is counted to acquire a statistic number BFNum related to the source IP address. It can be seen that no matter how many the source IP addresses are detected at the time interval, the value of the statistic number BFNum always falls between 0 and 1024.

It should be noted that the Bloom filter algorithm as shown in FIG. 3 is also applicable for the counting of numbers of the destination IP address and source and destination ports. Besides, the length of the bit array applied in the flow chart 300 can also be adjusted, i.e., it is not necessarily 1024. For instance, the length of the bit array can be modified based on the size of the time interval, the traffic of the network environment where the abnormal traffic analysis and detection are performed, etc. For example, if the number of data stream acquired at the time interval is comparatively large, the result acquired through hash calculation in step S304 has a comparatively higher possibility to have a collision, so we can consider increasing the length of the bit array appropriately to reduce the possibility of collision.

Back to FIG. 2, in step S204, after corresponding BFNums are calculated respectively for each of the source IP number, destination IP number, source port number and destination port number, the following formula is applied:

$$\frac{BFNum * \log(BFNum)}{Number_{stream}}$$

for calculating the above index values $x_4, x_5, x_6$ and $x_7$. Based on the applicant's analysis of the current abnormal traffic, the index values $X_4, X_5, X_6$ and $X_7$ calculated according to the above formula have good performance on determining whether abnormalities exist and whether p2p exists.

It can be seen that the above selected indexes $x_4, x_5, x_6$ and $x_7$, can all be calculated simply based on the data comprised in the header of IP packet, without further packet inside processing of the IP packet. Therefore, the selection of indexes in step S204 implies that the present invention can be applied to a network environment where contents are encrypted.

After a set of index values $\{x_{1,i}, x_{2,i}, x_{3,i}, \ldots, x_{7,i}\}$ has been calculated in step S204, in step S206, a primary detection is performed on the set of index values $\{x_{1,i}, x_{2,i}, x_{3,i}, \ldots, x_{7,i}\}$ by various common detection methods. Theses common detection methods can comprise for example a threshold detection method and a historical baseline detection method, i.e., to compare each index value in the set of index values with the corresponding threshold or historical average value to determine whether these index values are abnormal. The primary detection can determine which indexes are abnormal. Then, a new index vector $\{y1, y2, \ldots, y7\}$ is established by standardizing these indexes. For instance, for a normal index value, the value of yj (j=1-7) is set to 0; for an abnormal index value, yj is set to a certain value between 0 and 1, wherein the closer the value of yj is to 1, the greater abnormality the index has. As a result, a vector $\{y1, y2, \ldots, y7\}$ is formed for each server at a certain time i, and each element of the vector falls within [0, 1]. Of course, it is also acceptable to adopt other standard indexes instead of standardization.

Figure 4:
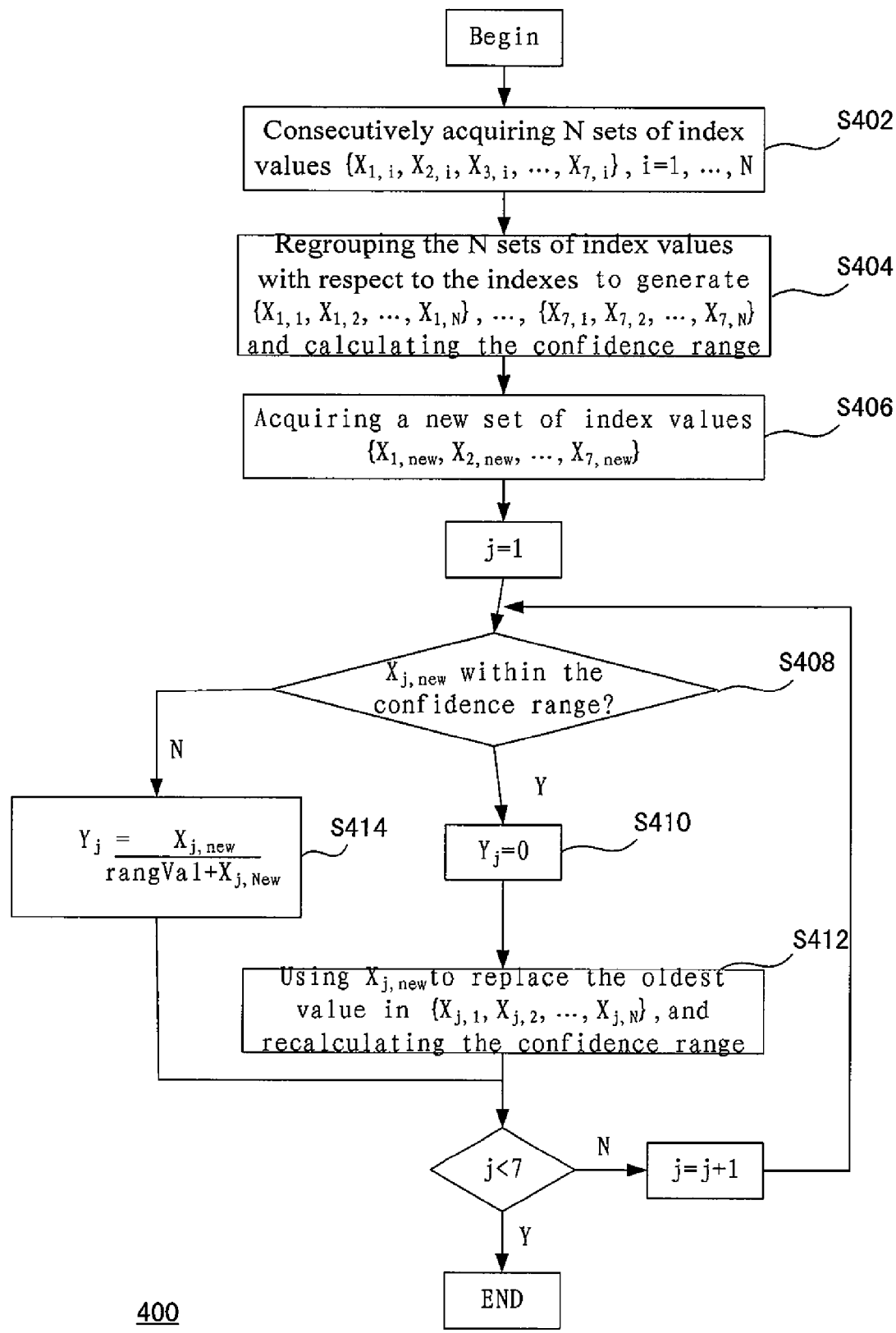
FIG. 4 illustrates the specific flowchart of applying a time window based detection method for a primary detection in the network abnormal traffic analysis and detection method in accordance with an embodiment of the present invention.

According to an embodiment of the present invention, in the primary detection of step S206, a time window based detection method is adopted. FIG. 4 illustrates the specific flow chart 400 of applying a time window based detection method in step S206.

Firstly, in step S402, N sets of index values $\{x_{1,i}, x_{2,i}, x_{3,i}, \ldots, x_{7,i}\}$ calculated in step S204 are consecutively acquired, where i=1, ..., N. That is, at this moment, the length of the time window equals the time interval multiplied by N, the value of N being usually set to 10.

Subsequently in step S404, the N sets of index values are regrouped with respect to the indexes for acquiring 7 groups of indexes, wherein each group comprises N elements, For instance, those groups of indexes may comprise the index group of Tcp traffic ratio: $\{x_{1,1}, x_{1,2}, \ldots, x_{1,N}\}$, the index group of Tcp traffic ratio: $\{x_{2,1}, x_{2,2}, \ldots, x_{2,N}\}, \ldots$, the index group of source port number ratio: $\{x_{7,1}, x_{7,2}, \ldots, x_{7,N}\}, \ldots$, and then a confidence range for each new index group is calculated. The so-called confidence range is an range from the largest value to the smallest value among N index values of a certain index group.

In step S406, a new set of index values $\{x_{1,new}, x_{2,new}, x_{3,new}, \ldots, x_{7,new}\}$ is acquired. Then for each newly acquired index value $x_{j,new}$, j=1-7, it is determined in step S408 whether the index value $x_{j,new}$ falls within the confidence range of the corresponding index group $\{x_{j,1}, x_{j,2}, \ldots, x_{j,N}\}$ established in step S404. If so, the corresponding vector element yj is set to 0 in step S410, and in step S412, the index value $x_{j,new}$ will replace the oldest index value in the index group $\{x_{j,1}, x_{j,2}, \ldots, x_{j,N}\}$ and the confidence range will be recalculated. On the contrary, if the index value $x_{j,new}$ falls outside of the confidence range, the value of yj is set in step S414 to:

$$\frac{x_{j,new}}{rangeVal + x_{j,new}}$$

where rangeVal is the upper limit of the confidence range of index group $\{x_{j,1}, x_{j,2}, \ldots, x_{j,N}\}$. A 7-dimensional vector $\{y1, y2, \ldots, y7\}$ can be obtained by repeating the processing of steps S408-S414 for each element of the new set of index values $\{x_{1,new}, x_{2,new}, x_{3,new}, \ldots, x_{7,new}\}$ acquired in step S406. Similarly, yj [0, 1], and the closer yj is to 1, the more possibly the index has an abnormality.

For the subsequent acquired sets of index values, they can be calculated directly by the above established time window to acquire the vector $\{y1, y2, \ldots, y7\}$ for each server.

Back to FIG. 2, after acquisition of the vector $\{y1, y2, \ldots, y7\}$ for each server at a certain time i in step S206, a secondary detection is performed on this vector in step S208 to determine whether the vector $\{y1, y2, \ldots, y7\}$ indicates an abnormality, and the type of the abnormality in case of abnormality. A classifier approach is usually adopted in step S208 for determining an abnormality.

Figure 5:
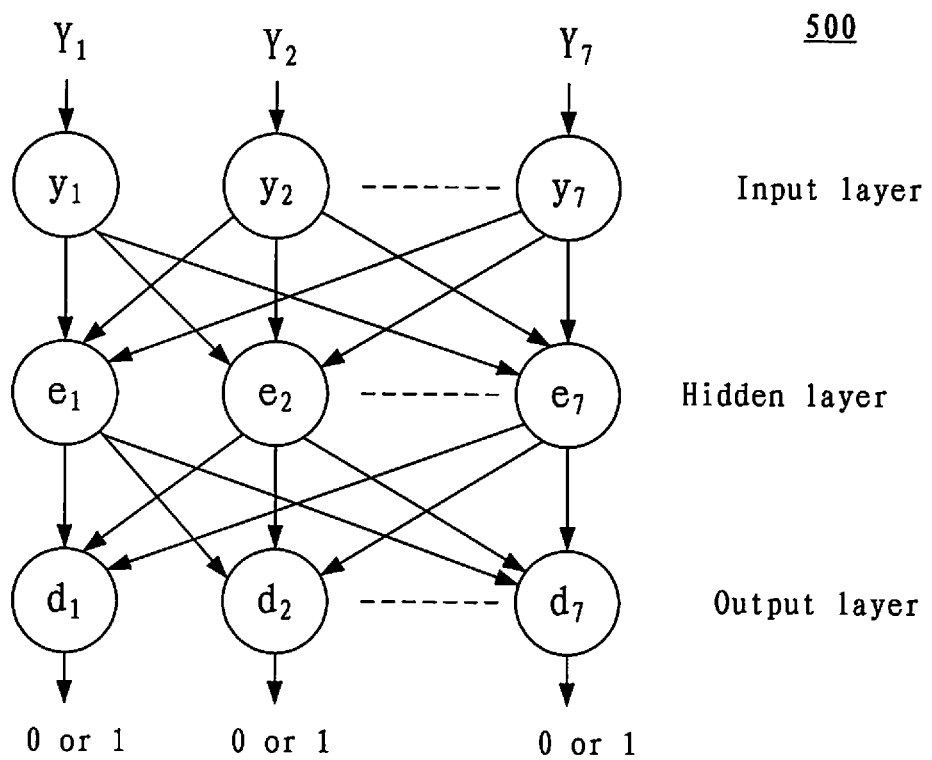
FIG. 5 illustrates a schematic structure of a neural network adopted for a secondary detection step in the network abnormal traffic analysis and detection method in accordance with an embodiment of the present invention.

FIG. 5 illustrates a schematic structure of a neural network 500 adopted in a secondary detection step S208 for determining whether the vector $\{y1, y2, \ldots, y7\}$ indicates an abnormality, as well as the type of the abnormality.

As shown in FIG. 5, in the present invention, a BP (Back Propagation) structure is adopted for the neural network. As the vector generated in step S206 has 7 elements, the defined neural network is a three-layered neural network with 7 input layer nodes and n output layer nodes, wherein yi represents the input layer nodes, ei the hidden layer nodes and di the output layer nodes. The value of n depends on the number of the targets to be judged, when the targets to be judged comprise, for instance, 7 targets of tcpflood, updflood, icmpflood, worm, P2P, portscan and ipscan, the value of n is also selected as 7. The number of the hidden layer nodes depends on the accuracy to be achieved by the system and the amount of the learning samples. In a BP neural network, there exists a transfer relation between each two of the input layer nodes, the hidden layer nodes and the output layer nodes. In order to enable the neural network to rapidly converge during the training, it is necessary to select an appropriate amount of hidden layer nodes, which can be learned from the prior knowledge of the BP neural network. In an embodiment of the present invention, 7 hidden layer nodes are used.

Besides, in the neural network 500 as shown in FIG. 5, the transfer function between the input layer and the hidden layer adopts the form of a sigmoidal activation function, while the transfer function between the hidden layer and the output layer adopts the form of a sign function. Thereby, the output of the output layer node di has only two possible values 0 and 1, where 0 represents absence of such abnormal type and 1 represents existence of such abnormal type. Therefore, if the neural network 500 is sufficiently trained, for the vector $\{y1, y2, \ldots, y7\}$ generated in step S206, the abnormality existing in the traffic and the type of the abnormality can be determined accurately in step S208.

Figure 6:
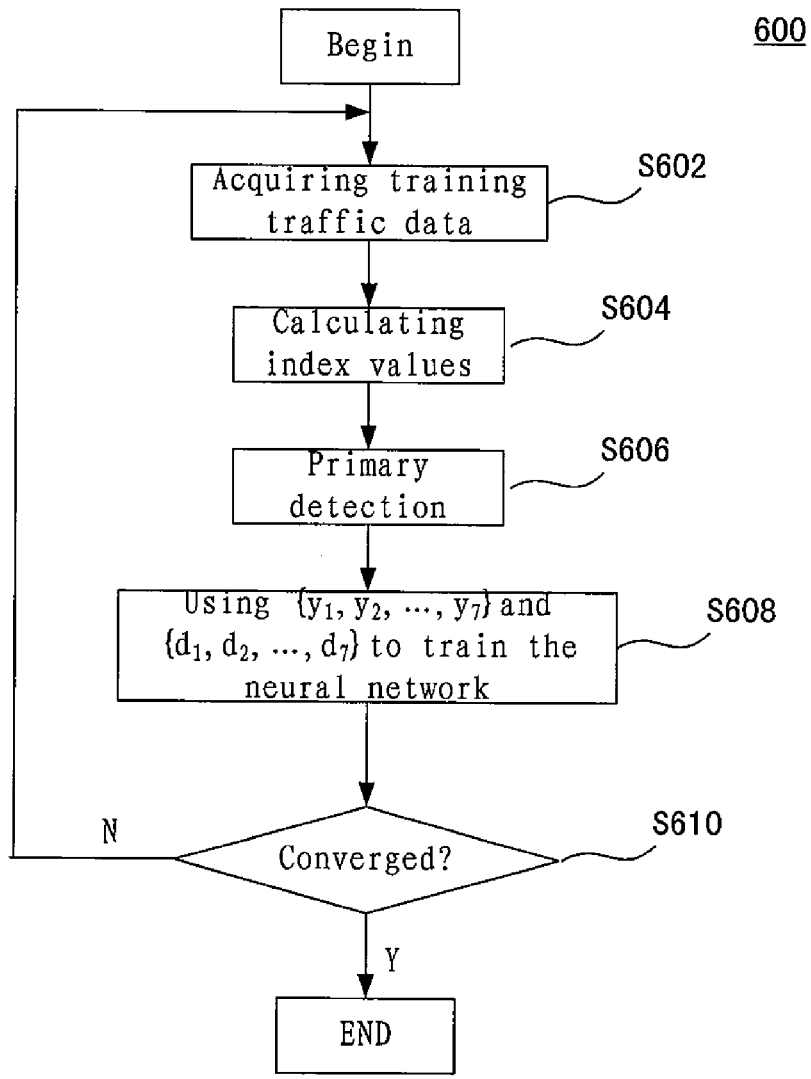
FIG. 6 illustrates a schematic flowchart of a training method for training a neural network 500 as illustrated in FIG. 5.

As mentioned previously, the neural network 500 should be trained before it is used. FIG. 6 illustrates a training method 600 for training the neural network 500.

In step S602 of FIG. 6, training traffic data is acquired, wherein the traffic data should satisfy the following requirements: firstly, the traffic data should be associated with a certain server; secondly, it should be known beforehand whether abnormal traffic associated with the server exists at the time the training traffic data being acquired and the type of abnormal, i.e., the output value of each output node di $\{d1, d2, \ldots, d7\}$ in the neural network 500 as shown in FIG. 5 should be known beforehand. According to an embodiment of the present invention, during the training, preferably the training data must contain traffic of at least one of the 7 types of abnormality as mentioned above, i.e., at least one of the output of di is 1. In steps S604-S606, similar to the steps of S204-S206 in FIG. 2, a vector $\{y1, y2, \ldots, y7\}$ corresponding to the original traffic is generated. Subsequently, in step S608, the neural network 500 is trained based on the vector $\{y1, y2, \ldots, y7\}$ (i.e., value of the input layer nodes) and the known value of output layer node di by the known neural network training method. Then back to step S602, the new training data is acquired continuously for further training until it is determined that the training process has been sufficient enough in step S610 and the coefficient of each transfer function has been converged. As the neural network training method is a technique well known in the art, it will not be discussed here.

Back to FIG. 2, although an approach of adopting a neural network for the secondary detection in step S208 has been described above in the combination of FIGS. 5 and 6, step S208 can also adopt the approach of an expert system, where experts directly give the probability relations between the abnormal index and the abnormal types and establish a Bayesian network for determining and classifying the abnormalities.

After the determined result of whether the traffic has abnormalities and abnormal types have been obtained through the secondary detection in step S208, the result is outputted in step S210 and an alarm function is initiated upon detection of abnormal types to inform the system administrator by means of for example SMS, email and so on.

After an abnormal traffic analysis and detection has been performed on a monitored server in steps S204-S210, it is determined whether there exists any other servers that need analysis and detection in step S212, if exists, the processing of a new server will be started by back to step S204. Based on the applicant's actual testing, if a network abnormal traffic analysis method according to the present invention is carried out on a computing device having a dual core processor with a frequency of 2 GHZ, it can analyze and detect at the same time 100 thousand to 1 million devices. Therefore, the present invention can be applicable for detection and analysis of a great number of servers.

As mentioned previously, the present invention usually performs the processing periodically at a certain interval, so after accomplishing the analysis and detection of all the monitored servers, it awaits until the elapse of a time interval to repeat the processing from step S204 to step S212. However, it should be noted that during waiting, the acquisition of the data stream in step S202 and the processing of data that needs consecutive processing in step S204 are not suspended.

It can be seen from the above description of the network abnormal traffic analysis and detection method according to the present invention that, compared with the method of the prior art, the most remarkable difference of the method according to the present invention lies in the added secondary detection processing. Thanks to the secondary detection processing, the accuracy of the abnormality detection and the abnormality type to be detected can be promoted greatly. Especially in applications where it is difficult for the traditional approaches to detect abnormal traffic, such as the P2P and VOIP based traffic, this method becomes more effective.

Besides, as the training of the neural network shown in FIG. 6 is performed on other systems and the real-time determined shown in FIG. 2 is performed on the neural network after the training, so the real-time performance will not be influenced.

Furthermore, as the input value required in the step of secondary diction of the present method, i.e., vector $\{y1, y2, \ldots, y7\}$, is generated through the primary detection, the classifier model adopted in the step of secondary diction is not related to the time interval during which data was acquired previously. Thereby, no matter how the time interval is adjusted, the neural network in the step of secondary diction requires no retraining.

Figure 7:
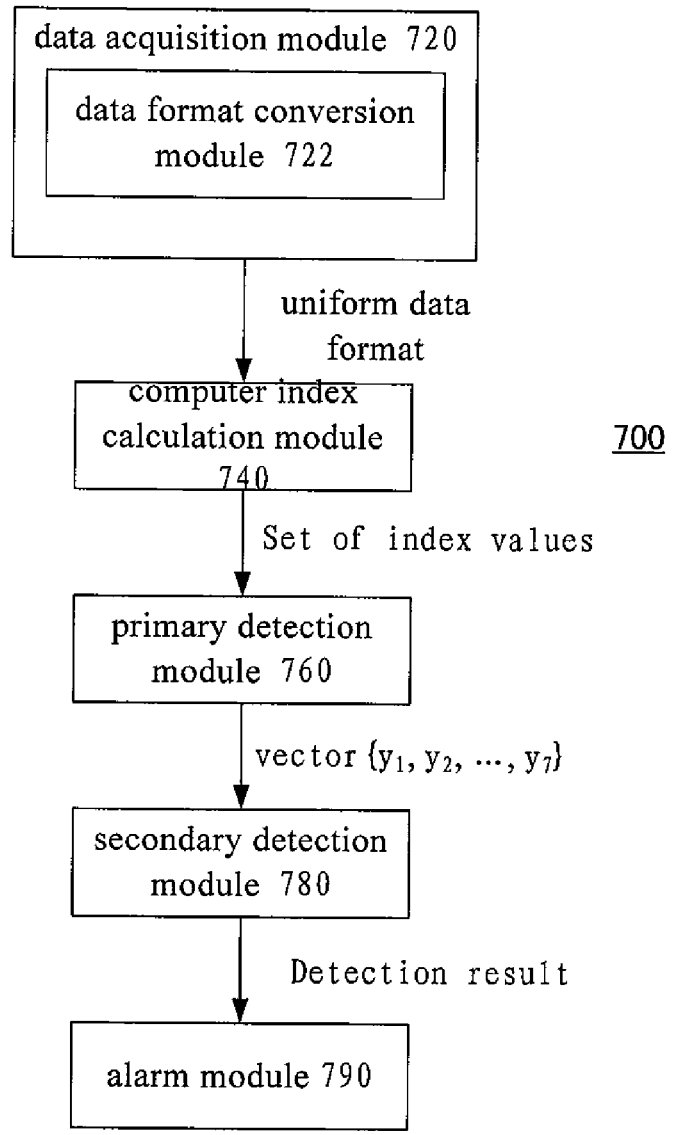
FIG. 7 illustrates a structure diagram of a network abnormal traffic analysis and detection apparatus 700 in accordance with an embodiment of the present invention.

FIG. 7 illustrates a structure diagram of a network abnormal traffic analysis and detection apparatus 700 in accordance with embodiments of the present invention.

As shown in FIG. 7, the network abnormal traffic analysis and detection apparatus 70 comprises a data acquisition module 720, a computer index calculation module 740, a primary detection module 760, a secondary detection module 780 and an alarm module 790.

The data acquisition module 720 acquires various kinds of network data. As the network data that may be acquired by the network abnormal traffic analysis and detection apparatus 70 can have many different formats, the data acquisition module 720 further comprises a data format conversion module 722 for converting data in different formats to data in a uniform data format (as shown in table 1) for use in other modules.

The computer index calculation module 740 receives data in a uniform data format from the data acquisition module 720 and calculates an index value for each monitored server based on that. The processing of the computer index calculation module 740 is similar to those described in the above step S204.

The primary detection module 760 receives the index values calculated by the computer index calculation module 740 and calculates a vector {y1, y2, . . . , y7} for each server based on those index values. The processing of the primary detection module 760 is similar to those described in the above step S206.

The secondary detection module 780 determines whether an abnormality exists and the type of the abnormality based on the vector {y1, y2, . . . , y7} calculated by the primary detection module 760 in a classifier approach. The processing of the secondary detection module 780 is similar to those described in the above step S208.

The alarm module 790 processes the output result of the secondary detection module 780. It usually displays the output result, and when the output result indicates an abnormality, informs the system administrator by various kinds of means such as SMS or email of the abnormality and the type of the abnormality.

It should be noted that in the network abnormal traffic analysis and detection apparatus according to the present invention, components therein are divided logically in light of the functions to be achieved. However, the present invention is not limited to that. Each component in the network abnormal traffic analysis and detection apparatus can be redivided or combined upon needs. For instance, some components can be combined as a single component or same components can be further divided into more subcomponents.

The embodiments of the present invention can be achieved by hardware or by software modules operated on one or more processors, or by a combination of them. Those skilled in the art should understand that microprocessors or digital signal processors (DSP) can be used in practice for carrying out some or all of the functions of some or all of the components in the network abnormal traffic analysis and detection apparatus according to the present invention. The present invention can also achieve a device or means program for executing part or all of the method described herein (for example, computer program and computer program product). Such program for realizing the present invention can be stored in a computer-readable medium or have the form of one or more signals, which signals can be downloaded from an Internet website or provided by a carrier signal or by any other forms.

It should be noted that the above embodiments illustrate rather than limit the invention, and that those skilled in the art will be able to design alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The present invention can be achieved by means of hardware comprising several different elements and by means of an appropriately programmed computer. In the unit claim enumerating several means, several of these means can be embodied by one and the same item of hardware. The use of ordinal words such as first, second and third does not represent any order, but instead, they can be understood as titles.

The invention claimed is:

1. A network abnormal traffic analysis method, comprising steps:

acquiring IP network data;

calculating a set of index values of a monitored server based on the acquired IP network data, wherein each index value of the set of index values reflects data streams related to the monitored server and each index value can be calculated according to the header of IP data packet;

performing a primary detection on the calculated set of index values to generate a vector, said vector corresponding to the set of index values, wherein each vector element indicates the degree of abnormality of a corresponding index value; and performing a secondary detection on the vector to determine whether abnormal traffic related to the monitored server exists and the abnormal types;

wherein the step of the primary detection comprises:

consecutively acquiring N sets of index values, where N is a positive integer, indicative of a length of a time window;

regrouping the N sets of index values by the indexes to acquire M groups of index groups, each group comprising N elements, where M is the number of the selected indexes;

calculating a confidence ranger for each group in the M groups of index groups;

acquiring a new set of index values;

for each index in the new set of index values:

if the value of the index falls within the confidence range of the corresponding index group in the M groups of index groups, the value of the corresponding vector element in the vector is set to 0, and the value of the index will replace the oldest index value in the corresponding group, and the confidence range of the corresponding group will be recalculated;

if the value of the index falls outside of the confidence range of the corresponding group in the M groups of index groups, the value of the corresponding vector element in the vector is set to:

$$\frac{x_{j,new}}{rangeVal + x_{j,new}}$$

where $x_{i,new}$ is the value of the index and rangeVal is the upper limit of the confidence range of the corresponding group in the M groups of index groups.

2. A network abnormal traffic analysis method according to claim 1, wherein the step of acquiring IP network data comprises:
converting the formats of the acquired IP network data to acquire data in a uniform data format.

3. A network abnormal traffic analysis method according to claim 2, wherein the uniform data format at least comprises the following fields: start time of the stream, sample rate, type of the data stream, source IP address, destination IP address, source port number, destination port number, number of packets comprised in the stream, and number of bytes comprised in the stream.

4. A network abnormal traffic analysis method according to claim 1, wherein the indexes at least comprise: Tcp traffic ratio, Udp traffic ratio, Icmp traffic ratio, destination IP number ratio, source IP number ratio, destination port number ratio, and source port number ratio.

5. A network abnormal traffic analysis method according to claim 4, wherein for calculating each or more of the destination IP number ratio, the source IP number ratio, the destination port number ratio and the source port number ratio, the following formula is applied:

$$\frac{BFNum * \log(BFNum)}{Number_{stream}}$$

wherein BFNum is a statistic number acquired by counting the corresponding destination IP number, source IP number, destination port number and source port number by a Bloom filter algorithm.

6. A network abnormal traffic analysis method according to claim 5, wherein the length of the bit array used in the Bloom filter algorithm is 1024.

7. A network abnormal traffic analysis method according to claim 1, wherein the step of calculating a set of index values of a monitored server comprises: periodically calculating the set of index values by a certain time interval.

8. A network abnormal traffic analysis method according to claim 1, wherein the step of the primary detection comprises:
comparing each index value in the set of index values with the corresponding threshold or historical average value to determine whether these index values are abnormal.

9. A network abnormal traffic analysis method according to claim 8, wherein the step of the primary detection further comprises:
establishing the vector by standardizing each index value in the set of the index values, wherein for a normal index value, the value of the corresponding vector element is set to 0; for an abnormal index value, the corresponding vector element is set to a certain value between 0 and 1, wherein the closer the value is to 1, the greater abnormality the index has.

10. A network abnormal traffic analysis method according to claim 1, wherein the step of the secondary detection comprises:
using a Back Propagation (BP) neural network to determine whether the vector indicates an abnormality and the type of the abnormality.

11. A network abnormal traffic analysis method according to claim 10, wherein the neural network comprises three layers, wherein the number of the input layer nodes corresponds to the length of the vector and each input layer node receives value of the corresponding vector element; the number of the output layer nodes correspond to a number of the targets to be determined, the output of the output layer nodes having only two possible values 0 and 1, and wherein a transfer function between the input layer and the hidden layer adopts the form of a sigmoidal activation function, while the transfer function between the hidden layer and the output layer adopts the form of a sign function.

12. A network abnormal traffic analysis method according to claim 11, wherein the number of the targets to be determined at least comprises one or more of the group comprising: tcpflood, updflood, icmpflood, worm, P2P, portscan and ipscan.

13. A network abnormal traffic analysis method according to claim 10, wherein when the neural network is trained, training traffic data should be associated with a certain server and whether abnormal traffic associated with the server exists and the type of abnormality should be known beforehand.

14. A network abnormal traffic analysis method according to claim 1, further comprising:
step of alarm, where an alarm is issued upon detection of abnormal types.

15. A network abnormal traffic analysis method according to claim 1, further comprising:
repeating by a certain interval the calculation of the set of index values, the primary detection and the secondary detection of the monitored server for a plurality of monitored servers.

16. A network abnormal traffic analysis apparatus, comprising:
a data acquisition module, for acquiring IP network data;
a computer index calculation module, for calculating a set of index values of a monitored server based on the acquired IP network data, wherein each index value of the set of index values reflects data streams related to the monitored server and said each index value can be calculated from the header of IP data packet;
a primary detection module, for performing a primary detection on the calculated set of index values to generate a vector, said vector corresponding to the set of index values, wherein each vector element indicates the degree of abnormality of a corresponding index value;
wherein the step of the primary detection comprises:
consecutively acquiring N sets of index values, where N is a positive integer, indicative of a length of a time window;
regrouping the N sets of index values by the indexes to acquire M groups of index groups, each group comprising N elements, where M is the number of the selected indexes;
calculating a confidence ranger for each group in the M groups of index groups;
acquiring a new set of index values;
for each index in the new set of index values:
if the value of the index falls within the confidence range of the corresponding index group in the M groups of index groups, the value of the corresponding vector element in the vector is set to 0, and the value of the index will replace the oldest index value in the corresponding group, and the confidence range of the corresponding group will be recalculated;
if the value of the index falls outside of the confidence range of the corresponding group in the M groups of index groups, the value of the corresponding vector element in the vector is set to:

$$\frac{x_{j,new}}{rangeVal + x_{j,new}}$$

where $x_{j,new}$ is the value of the index and rangeVal is the upper limit of the confidence range of the corresponding group in the M groups of index groups; and a secondary detection module, for performing a secondary detection on the vectors to determine whether abnormal traffic and abnormal types related to the monitored server exists.

17. A network abnormal traffic analysis apparatus according to claim 16, wherein the data acquisition module further comprises a data format conversion module for converting the formats of the acquired IP network data to acquire data in a uniform data format.

18. A network abnormal traffic analysis apparatus according to claim 16, further comprising an alarm module for issuing alarm upon detection of abnormal types.

19. A network traffic monitoring system, comprising:
a plurality of servers, receiving and/or transmitting network data from and/or to the outer network; and
a network abnormal traffic analysis apparatus according to claim 16, for analyzing and detecting whether traffic abnormality exists in the above network data as well as the type of the abnormality.

20. A network traffic monitoring method, comprising steps:
receiving and transmitting network data between a plurality of servers and the outer network; and
adopting the method according to claim 1 to analyze and detect whether traffic abnormality exists in the above network data as well as the type of the abnormality.

21. A computer program product embodied on a non-transient computer-readable medium and configured so as when executed on a processor of the device to perform the steps of the method according to claim 1.

22. A non-transitory computer readable recording medium which stores instructions for achieving the steps of the method according to claim 1 when being loaded to a computer and operated thereon.

* * * * *